United States Patent

Long et al.

[15] 3,635,614
[45] Jan. 18, 1972

[54] APPARATUS FOR PRODUCING EMBOSSED PLASTIC ARTICLES

[72] Inventors: Alfred R. Long, Acton, Ontario, Canada; George A. Viehmann, New Providence, N.J.

[73] Assignee: Construction Specialties, Inc., Cranford, N.J.

[22] Filed: Nov. 14, 1969

[21] Appl. No.: 876,696

Related U.S. Application Data

[62] Division of Ser. No. 695,800, Jan. 4, 1968, Pat. No. 3,496,262.

[52] U.S. Cl. ...............................425/71, 425/325, 425/385
[51] Int. Cl. ..........................................................B29d 7/14
[58] Field of Search...............18/9, 10, 12 TB, 12 TF, 12 TT, 18/13 K, 4 S, 19 RR

[56] References Cited

UNITED STATES PATENTS 2,791,801  5/1957  Szantay.............................264/327 X
2,889,581  6/1959  Vanderhoof.........................18/12 TT
3,241,182  3/1966  Kessler.................................18/12 TF Primary Examiner—H. A. Kilby, Jr.
Attorney—Brumbaugh, Graves, Donohue & Raymond

[57] ABSTRACT

An apparatus for making embossed strips of extruded thermoplastic resins such as vinyl resins to close manufacturing tolerances in which heated plastic is extruded in the form of a strip with an undercut portion or rib which must be controlled closely in its cross-sectional dimensions, the rib and adjacent surfaces of the strip being cooled by immersion in a bath of liquid while the remainder of the strip, in a plastic state, is passed in contact with an embossing roll to apply a pattern to it, the entire strip thereafter being cooled by immersion in a bath of liquid to prevent flow or recovery of the plastic from marring the pattern applied by the embossing roll.

4 Claims, 4 Drawing Figures

PATENTED JAN 18 1972

3,635,614

INVENTORS:
ALFRED R. LONG
GEORGE A. VIEHMANN

THEIR ATTORNEYS

APPARATUS FOR PRODUCING EMBOSSED PLASTIC ARTICLES

This is a division of our pending application, Ser. No. 695,800, for "Method for Producing Embossed Plastic Articles," filed Jan. 4, 1968 now U.S. Pat. No. 3,496,262.

This invention relates to the production of articles from thermoplastic resins, such as vinyl resins, having an embossed surface with a sharply defined pattern and other portions thereof having closely controlled dimensions.

It has been proposed heretofore to emboss the surfaces of sheets of thermoplastic material by means of embossing drums, belts or combinations of the same and many different types of products have been made by such procedures and apparatuses. The sheets so made and the patterns or designs embossed thereon have not required sharpness of detail or control within close tolerances and, accordingly no real difficulty is encountered in producing them with the equipment currently available. However, when it is desired to produce a sharply defined pattern such as knurling, checkering or the like, the normal recovery flow of the plastic dulls the sharpness of the pattern and mars its effect and usefulness. Moreover, the normal shrinkage of the plastic during cooling and the recovery flow of the plastic has prevented the production, by extrusion, of products having precisely controlled dimensions.

In accordance with the present invention, an apparatus and method are provided whereby extruded thermoplastic products can be obtained with sharply defined patterns and closely controlled dimensions.

More particularly, in accordance with the invention, an apparatus is provided including an extrusion device for extruding a heated thermoplastic material in the form of a strip of a predetermined cross section and having on one surface a rib or the like, the dimensions of which must be controlled within close limits and having another surface adapted to be embossed with a clearly defined pattern, the ribbed portion of the strip being subjected immediately after extrusion to cooling to set it in its predetermined shape by immersing it in a cooling liquid while supporting the remainder of the strip so that an embossing roller or the like can emboss a pattern on a surface of the strip while it is still in a thermoplastic condition and thereafter immersing the entire strip in a cooling liquid to prevent the pattern from being marred by the memory effect or flow of the thermoplastic material. In this way, strips suitable for application to gratings or grilles of the type disclosed in the Viehmann et al. application Ser. No. 514,485, filed Dec. 17, 1965, can be provided which can be attached securely to the grating bars and which will have a well-defined nonskid pattern exposed to traffic and wear.

The immediate cooling of the rib portion adapted to interlock with the grating bar preserves its shape and controls its dimensions so that it is not deformed during the embossing operation while nevertheless enabling another surface of the strip to be deformed into the desired nonskid or other pattern.

For a better understanding of the present invention, reference may be had to the accompanying drawings, in which FIG. 1 is a top plan view of apparatus shown partially broken away embodying the present invention for forming extruded embossed strips;

Figure 1:
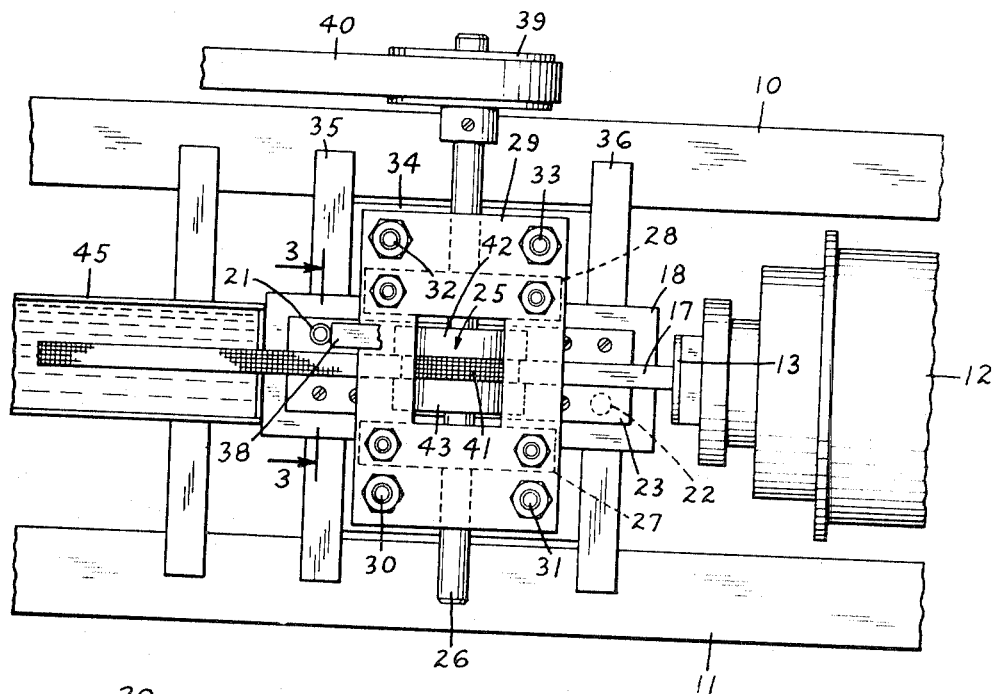

Referring to the drawings, a typical apparatus includes a frame including a pair of frame members 10 and 11 adjacent one end of which is mounted a conventional extrusion cylinder 12 and containing a screw or plunger, not shown, and being suitably heated to render a thermoplastic material sufficiently plastic to enable it to be extruded through an extrusion die 13 having an opening of a suitable cross section. By way of example, the extrusion orifice may be such as to provide a strip having a wide flat body portion 14 and a generally spear-shaped rib 15 on the bottom thereof which may be solid or provided with a longitudinal aperture 16. The upper surface 17 of the strip as extruded, FIG. 1, may be smooth and flat or slightly convex, as desired. The extrusion cylinder 12 may be mounted on the frame or independently, as desired. Adjacent the die plate 13 is a container or tank 18 for a cooling liquid having an inlet 19 through which cooling liquid may be introduced by means of a hose 20 and nozzle 21 and from which the liquid can be discharged by means of a drain pipe 22, FIGS. 1 and 2. A two-piece cover plate 23 of heat-conductive material, such as brass or copper, is mounted on the upper part of the tank 18 and provides a longitudinally extending slot 24 for receiving the rib 15 so that it is immersed in the cooling liquid in the tank and thus is hardened by contact with the cooling liquid. Also, the undersurface of the T-shaped head on the strip is cooled and solidified by engagement with the cover 23 on opposite sides of the slot 24 and by contact with any liquid which may spill over and out of the slot 24. The upper portion of the T-shaped head remains in a plastic condition.

In order to emboss a pattern on the upper surface 17 of the strip, an embossing roll 25 is mounted above the tank 18 in a position to engage the surface of the strip. The roll 25 is mounted on a shaft 26 received in pillow blocks 27 and 28 attached to a plate 29 which spans the tank 18 and is carried on the upper ends of four supporting rods 30, 31, 32 and 33 either directly connected with the frame members 10 and 11 or to a plate 34 having crossbars 35 and 36 at its ends which are secured to the frame members 10 and 11. The crossbars and the supporting plate 34 support the tank 18.

The nozzle 21 is mounted in a tubular support 37 carried by a bar 38 which also is fixed to the top plate 29 as by welding or the like to position it in alignment with the inlet port 19 of the tank.

Figure 2:
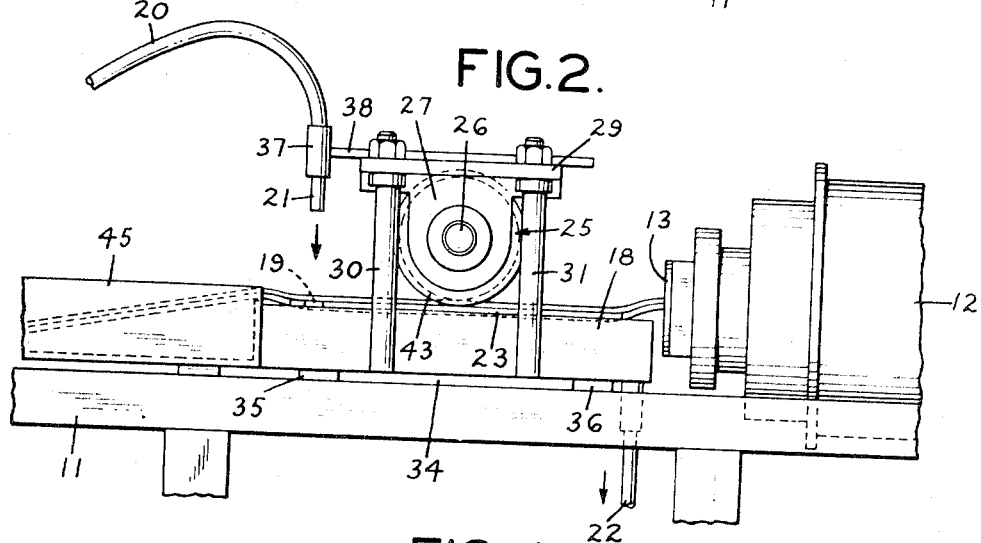
FIG. 2 is a side elevational view thereof partially broken away.
Figure 3:
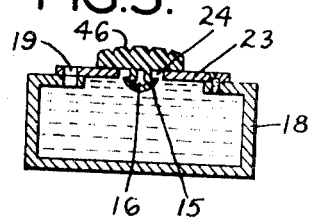
FIG. 3 is a view in cross section of a portion of the apparatus taken on line 3—3 of FIG. 1.

As shown in FIG. 1, the shaft 26 is provided with a pulley 39 driven by means of a belt 40 and a variable speed transmission and motor, not shown, so that the peripheral speed of the embossed area 41 of the embossing roll 25 is equal to the rate of extrusion of the strip of plastic to avoid marring of the surface and blurring of the embossed pattern on the surface 17 of the strip. On opposite sides of the embossed area 41 of the roll are flange portions 42 and 43 of greater diameter than the embossed surface so that the flanges slide against the surface of the plate 23 on the tank and are cooled thereby and also confine the lateral edges of the extruded strip during the embossing action. If desired, the embossing roll can be hollow and cooled by flow of water through it. After passage of the strip beneath the embossing roll and along the top of the tank 18, the entire strip is immersed in a coolant tank 45 also supported on the frame members 10 and 11 in any suitable way so as to congeal the strip and maintain the sharpness of the embossed pattern represented by the checkered surface 46 in FIG. 4. In this way, not only is the shape of the rib 15 maintained against deformation during the embossing action, but the embossed pattern is also kept sharp and clean and unmarred by any recovery or memory effect on the part of the extruded plastic.

By way of example of a typical process, a strip suitable for the use in grating bars is composed of a vinyl plastic of suitable type such as the standard Goodrich AE 364 manufactured by Goodrich Tire & Rubber Company. The vinyl is extruded at a temperature of 350° F. and at a rate of approximately 20 feet a minute. The opening in the die 13 is approximately 15 percent larger in area in a horizontal direction and 5 percent larger in a vertical direction than the dimensions of the finished strip to compensate for differential cooling of the product. The cooling tank 18 is approximately 2 inches from the die 13 so that the rib and the bottom of the crosshead 14 of the strip are subjected to immediate cooling. Water is supplied to the cooling bath or tank 18 at a temperature of about 50° F. and at a rate of about 4 gallons per minute. The embossing roll 25 is spaced approximately 3 inches from the die plate 13, that is, with an embossing roller 5 inches in diameter, the center of the roll will be spaced about 5½ inches from the die plate. As indicated above, the embossing roll 25 is cooled by contact with the brass plate 23 to a temperature of approximately 100° F. At the time the strip engages the roll 25, the top of the strip has a temperature of about 300° F. while the rib 15 has been cooled to about 180° F. The embossing section 40 of the roll has a peripheral speed of 20 feet per minute, thereby being synchronized with the rate of extrusion of the strip through the die 13.

After embossing, the strip continues along the cooling tank 18 about another 2 inches and then is immersed in the water tank 45 where a water temperature of between 50° and 60° F. is maintained.

Figure 4:
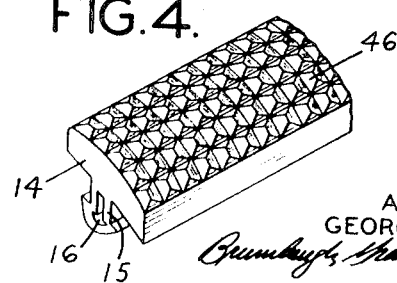
FIG. 4 is a perspective view of a typical form of embossed extruded strip produced with the apparatus.

By this process, a checkered or other pattern such as that shown in FIG. 4 having sharply defined edges can be applied to the surface of the strip either in flat form or convexly curved, as shown in FIG. 4, while the rib 15 is prevented from deforming and the desired dimensions thereof are maintained enabling the strip to be used without further treatment, for example, in gratings and the like of the type described above.

It will be understood that other articles than antiskid strips for gratings may be made by the process and that the form of the extruded article is susceptible to wide modification, for example, strips or sheets having a plurality of ribs of a desired shape and having the same or different surface ornamentations may be provided by suitable modification of the apparatus. Accordingly, it will be understood that the form of apparatus and the method disclosed herein are illustrative and do not limit the scope of the invention as defined in the following claims.

We claim:

1. Apparatus for producing an article having a sharply defined pattern on at least one surface and a rib of predetermined cross-sectional shape and dimensions on another surface thereof, comprising an extruder for extruding a continuous strip of heated thermoplastic resin having a rib on one side and an opposite surface, a container for cooling liquid adjacent to said extruder, a cover for said container for supporting said strip for sliding movement therealong and having a slot therein for receiving said rib for immersion in said liquid, a movable embossing member above said cover for engaging said surface of said strip, means containing cooling liquid for immersion of said embossed strip therein adjacent to the end of said cover remote from said extruder.

2. The apparatus set forth in claim 1 in which said embossing member is a roll having a pattern-forming periphery spaced from said cover and side flanges slidably engaging said cover.

3. The apparatus set forth in claim 2 in which said cover is composed of highly thermal-conductive metal.

4. Apparatus for producing a strip article from thermoplastic material having on at least one surface thereof a well-defined pattern, comprising:
   means for extruding a heated continuous strip of said material;
   means for supporting a first portion of said strip remote from said one surface while said strip is still heated and for permitting relative movement of said strip as it is extruded, said means having an opening therein, means for contacting a second portion of said strip remote from said one surface through said opening in said supporting means with a fluid cooling medium for cooling at least said portion without substantially cooling said one surface;
   and means for embossing the pattern on said one surface while said first portion is supported by said supporting means and said one surface is still heated.

* * * * *